United States Patent
Lundberg et al.

(10) Patent No.: US 12,412,600 B2
(45) Date of Patent: Sep. 9, 2025

(54) EDITABLE SIGNED VIDEO DATA

(71) Applicant: Axis AB, Lund (SE)

(72) Inventors: Stefan Lundberg, Lund (SE); Björn Völcker, Lund (SE)

(73) Assignee: AXIS AB, Lund (SE)

( * ) Notice: Subject to any disclaimer, the term of this patent is extended or adjusted under 35 U.S.C. 154(b) by 55 days.

(21) Appl. No.: 18/511,001

(22) Filed: Nov. 16, 2023

(65) Prior Publication Data
US 2024/0203457 A1    Jun. 20, 2024

(30) Foreign Application Priority Data

Dec. 15, 2022   (EP) .................................... 22213744

(51) Int. Cl.
| | | |
|---|---|---|
| *G06F 21/10* | (2013.01) | |
| *G06F 21/30* | (2013.01) | |
| *G11B 27/036* | (2006.01) | |
| *G11B 27/00* | (2006.01) | |
| *G11B 27/02* | (2006.01) | |

(52) U.S. Cl.
CPC ........ *G11B 27/036* (2013.01); *G06F 21/1062* (2023.08)

(58) Field of Classification Search
CPC .......... G06F 21/10; G06F 21/30; G06F 21/60; G11B 27/036; G11B 27/00; G11B 27/02; G11B 31/00; G11B 33/00
USPC ........ 386/260, 259, 258, 252, 239, 278, 280
See application file for complete search history.

(56) References Cited

U.S. PATENT DOCUMENTS

| | | | |
|---|---|---|---|
| 5,907,619 A | 5/1999 | Davis | |
| 7,437,007 B1 | 10/2008 | Augustine et al. | |
| 11,082,710 B2 * | 8/2021 | Hoarty | H04N 19/182 |
| 2010/0177891 A1 * | 7/2010 | Keidar | G06F 21/60 |
| | | | 375/E7.026 |

(Continued)

FOREIGN PATENT DOCUMENTS

| | | | |
|---|---|---|---|
| EP | 3968636 A1 | 3/2022 | |
| EP | 4090015 A1 | 11/2022 | |

(Continued)

OTHER PUBLICATIONS

Lin C-Y et al: "Issues and Solutions for Authenticating MPEG Video" Proceedings of SPIE, IEEE, US, vol. 3657, Jan. 25, 1999.

(Continued)

*Primary Examiner* — Daquan Zhao
(74) *Attorney, Agent, or Firm* — Volpe Koenig

(57) ABSTRACT

A signed video bitstream obtained by prediction coding of a video sequence includes data units and associated signature units, wherein each data unit represents at most one macroblock in a video frame of the video sequence, and each signature unit includes a digital signature of a bitstring derived from fingerprints of exactly one associated data unit each. The bitstream is edited by: receiving a request to substitute a region; determining a first set of macroblocks, in which said region is contained, and a second set of macroblocks referring to macroblocks in the first set; adding an archive object that includes fingerprints of a first and a second set of data units, which represent the first and second set of macroblocks; editing the first set of data units in accordance with the request to substitute; and re-encoding the second set of data units.

11 Claims, 10 Drawing Sheets

(56) References Cited

U.S. PATENT DOCUMENTS

2014/0010366 A1   1/2014   Quinn et al.
2020/0267404 A1   8/2020   Levy et al.
2022/0086468 A1   3/2022   Hultqvist et al.

FOREIGN PATENT DOCUMENTS

EP        4164173 A1    4/2023
EP        4164230 A1    4/2023
WO   2021/059593 A1    4/2021

OTHER PUBLICATIONS

Ramaswamy, N., "Video Authentication for H.264/AVC using Digital Signature Standard and Secure Hash Algorithm", International Workshop on Network and Operating System Support for Digital Audio and Video, (2006).
Extended European Search Report issued on Apr. 17, 2023 for European Patent Application No. 22213744.0.
Extended European Search Report issued on Apr. 17, 2023 for European Patent Application No. 22213745.7.
Recommendation H.264 (Jun. 2019), "Advanced video coding for generic audiovisual services," H.264 (2019).

* cited by examiner

EDITABLE SIGNED VIDEO DATA

TECHNICAL FIELD

The present disclosure relates to the field of security arrangements for protecting video data against unauthorized activity, especially in connection with storage and transmission of data. It proposes methods and devices for editing a signed video bitstream and for validating a signed video bitstream that may result from such editing.

BACKGROUND

Digital signatures provide a layer of validation and security to digital messages that are transmitted through a non-secure channel. By means of the digital signature, the authenticity or integrity of a message can be validated, and non-repudiation can be ensured. With regard to video coding particularly, there are safe and highly efficient methods for digitally signing a prediction-coded video sequence, which have been described in the prior art. See for example the earlier patent applications EP21201360.1 (EP4164173A1) and EP21201362.7 (EP4164230A1) by the present inventors. See also US20140010366A1, which proposes a cryptographic video verification technique that is specifically adapted for prediction-coded video data with a group-of-pictures structure.

A video sequence may need to be edited after it has been signed. In addition to visual improvements, the edits could aim to ensure privacy protection by cropping, masking, blurring or similar image processing that renders visual features less recognizable. With most available methods, this will require re-encoding and re-signing the edited frames in their entirety. The re-encoding and re-signing should preferably be extended into a number of neighboring frames too, even though the neighboring frames are not directly affected by the edits, so as not to disturb any prediction-coding dependencies (inter-frame/intra-frame references) that may exist. These steps may consume significant computational resources and could lead to delays that are awkward for the user.

U.S. Pat. No. 7,437,007B1 discloses a method of performing region-of-interest editing of a video stream in the compressed domain. The compressed video stream includes a compressed video stream frame, which represents a video stream frame having an unwanted portion and a region-of-interest portion. According to the method, the compressed video stream frame is edited to modify said unwanted portion and obtain a compressed video stream frame comprising said region-of-interest portion while maintaining an original structure of said video stream. To achieve this, said editing comprises skipping macroblocks located above, below and to the right of said region-of-interest portion for predictive coded (P) frames and bi-directionally predictive-coded (B) frames. The video stream under consideration in U.S. Pat. No. 7,437,007B1 is not a signed video stream.

SUMMARY

One objective of the present disclosure is to make available a method of editing a signed video bitstream obtained by prediction coding of a video sequence that largely avoids the need to re-sign the bitstream outside the portions affected by the editing, as is the case with some available methods. A particular objective is to make available such a video editing method that preserves the signatures of all macroblocks except for the edited ones and any further macroblocks that refer to these, whether directly or indirectly. A further objective is to enable the video editing without any significant detriment to the data security of the original signed video bitstream. A further objective is to provide a method of validating a signed video bitstream obtained by prediction coding of a video sequence. It is a still further objective to provide devices and computer programs for these purposes.

At least some of these objectives are achieved by the invention as defined by the independent claims. The dependent claims relate to advantageous embodiments of the invention.

In a first aspect of the present disclosure, there is provided a method of editing a signed video bitstream, which has been obtained by prediction coding of a video sequence. The signed video bitstream shall include data units and associated signature units. Each data unit represents (i.e., encodes) at most one macroblock in a video frame of the prediction-coded video sequence. Each signature unit includes a digital signature of a bitstring derived from a plurality of fingerprints of exactly one associated data unit each. The signature unit may optionally include the bitstring to which the digital signature pertains. For a signed video bitstream with these characteristics, the method comprises the following steps: receiving a request to substitute a region of at least one video frame (e.g., substitute a privacy mask for the region's pixel values, in one or multiple video frames); determining a first set of macroblocks, in which said region is contained, and a second set of macroblocks referring directly or indirectly to macroblocks in the first set; adding an archive object to the signed video bitstream, the archive object including fingerprints of a first and a second set of data units, which respectively represent the determined first and second set of macroblocks; editing the first set of data units in accordance with the request to substitute; and re-encoding the second set of data units. The signature unit may optionally include the derived bitstring to which the digital signature pertains ('document approach').

Because each data unit represents at most one macroblock, it follows that the data units and macroblocks are in a one-to-one relationship, or some macroblocks are represented by—and can be reconstructed from—two or more data units. No data unit represents multiple macroblocks (nor portions of multiple macroblocks), and thus the direct effect of editing some macroblocks is confined to the edited macroblocks' data unit or data units (first set). Since furthermore each fingerprint is a fingerprint of exactly one associated data unit, the need for re-signing data units after the editing is kept in bounds. More precisely, the method according to the first aspect preserves any prediction-coding dependencies that connect pairs or groups of macroblocks, namely, by determining and re-encoding a set (second set) of data units representing macroblocks referring directly or indirectly to the edited macroblock(s). If the re-encoding is restricted to this second set of data units, the method will utilize available computational efforts efficiently. This allows the method to be executed with satisfactory performance on ordinary processing equipment.

The method according to the first aspect involves a further advantage on the recipient side. Thanks to the archive object, from which the fingerprints of the first and second sets of data units can be retrieved, a recipient will be able to validate all data units of the signed video bitstream that have not been affected by the editing. This allows a significant part of the existing signatures to be preserved; the video editing method according to the first aspect can be said to be minimally destructive in this regard. The validation at the recipient side will be explained in detail within the second aspect of the present disclosure.

In some embodiments, the archive object further includes positions of the first and second sets of macroblocks. A position may refer to the macroblock's position in a frame, e.g., in frame coordinates. If a static macroblock partitioning is used, the position of a macroblock can be expressed as a macroblock sequence number or another identifier. This provides one way of aiding a recipient of the edited video bitstream to determine whether a particular macroblock has been changed, and thus to select the proper way of obtaining a fingerprint of the data unit that represents said macroblock.

Some embodiments provide an advantageous procedure for editing the first set of data units. More precisely, such editing may include decoding the data unit into a reconstructed macroblock; providing an edited macroblock by performing the requested substitution on the reconstructed macroblock; and providing an edited data unit by encoding the edited macroblock. If the region to be substituted covers the entire reconstructed macroblock, the edited data unit may in particular be provided by encoding a subset of the region, e.g., an intersection of the macroblock and the region.

Within such embodiments, it is optional to encode the macroblock resulting after the substitution as an intra-coded macroblock (I-block), whereby an independently decodable data unit is obtained. This accounts for the fact that the substitution may introduce a sudden temporal change in the video sequence; this tends to lessen the time continuity of the video sequence, so that most known prediction coding techniques will perform less well.

Still within the above-outlined procedure for editing the first set of data units, it is possible to use the reconstructed macroblock to decode a data unit in the second set. The decoding is predictive since the second set of data units represent the second set of macroblocks, which refer directly or indirectly to the first set of macroblocks. The output of decoding said data unit in the second set will be used in the re-encoding step.

In different embodiments, the re-encoding of the second set of data units can be performed by prediction coding with reference to the edited first set of data units or it can be performed by non-predictive coding. The choice of one of these two options may correspond to striking a desired balance between quality and bitrate. Further still, the second set of data units may be re-encoded using reduced data compression. In lossy video coding formats, the data compression is achieved by discarding some of the information in the video sequence, such as by quantization of pixel values. The degree of quantization may for example correspond to a value of a quantization parameter (QP) representing the fineness of the quantized pixel values. The degree of quantization may further depend on the entries in the definition of a scaling matrix. Assuming the video sequence is encoded at a predetermined regular data compression level, it is foreseen to encode the second set of macroblocks at a data compression level that is reduced relative to the regular data compression. The use of the reduced data compression level will imply that a lesser amount of information in the macroblocks is discarded in the encoding step, e.g., by mapping the macroblock's pixel values to a relatively finer set of quantized pixel values. In other words, the macroblocks in the second set are encoded at a relatively higher bitrate than they would be if the regular data compression level was used, and it can be played back with less residual errors. The additional memory or bandwidth cost is likely to be acceptable, all the more so in use cases where edits usually occur infrequently and/or in isolated portions of the video sequence.

In some embodiments, the data security of the edited signed video bitstream is improved by providing, in the bitstream, one or more signature units associated with the edited first set of data units and/or the re-encoded second set of data units. This avoids a scenario of unauthorized modification of the edited first set of data units and the re-encoded second set of data units. The one or more signature units may be new signature units added to the bitstream or edited versions of signature units that were included in the signed video bitstream prior to the editing.

According to a generalization of the first aspect, there is provided a video editing method performed on a signed video sequence which includes data units and associated signature units. Each data unit represents at most N macroblocks in a video frame of the prediction-coded video sequence. Here, N is a small integer number, such as 1, 2, 3, 4, 5 or at most 10. Each signature unit includes a digital signature of a bitstring derived from a plurality of fingerprints of exactly one associated data unit each and optionally the bitstring. The video editing method includes: receiving a request to substitute a region of at least one video frame; determining a first set of macroblocks, in which said region is contained, and a second set of macroblocks referring directly or indirectly to macroblocks in the first set; adding an archive object to the signed video bitstream, the archive object including fingerprints of a first and a second set of data units, which respectively represent the determined first and second set of macroblocks; editing the first set of data units in accordance with the request to substitute; and re-encoding the second set of data units.

Because, according to this generalization, each data unit represents at most N macroblocks, the direct effect of editing one macroblock is confined to the edited macroblock's at most N data units. Since furthermore each fingerprint is a fingerprint of exactly one associated data unit, the need for re-signing data units after the editing is kept in bounds. In particular, the archive object will hold at most N times as many fingerprints as the cardinality of the first and second sets of macroblocks, so that the video editing method will have feasible complexity.

In a second aspect of the present disclosure, there is provided a method of validating a signed video bitstream obtained by prediction coding of a video sequence. It is understood that the signed video bitstream includes data units, signature units each associated with some of the data units, and an archive object. Each data unit represents at most one macroblock in a frame of the prediction-coded video sequence. Each signature unit includes a digital signature of a bitstring and optionally the bitstring itself. Finally, the archive object includes at least one archived fingerprint of a data unit. The method of validating the signed video bitstream comprises: obtaining a fingerprint of each data unit associated with a signature unit, by either computing a fingerprint of the data unit, or retrieving an archived fingerprint from the archive object; deriving a bitstring from the obtained fingerprints; and validating the data units associated with the signature unit using the digital signature in the signature unit. The final validation step may include verifying the derived bitstring using the digital signature. Alternatively ('document approach'), the validation step includes verifying a bitstring in the signature unit using the digital signature, and comparing the derived bitstring and the verified bitstring.

The archive object may have been added by performing the editing method according to the first aspect, but the method according to the second aspect can be performed without reliable knowledge of such prior processing. Accordingly, the method according to the second aspect achieves a validation of the authenticity of the video sequence in that it verifies that the digital signatures (and any bitstrings) carried in the signature units are indeed consistent with the fingerprints of the associated data units. Hence, the data units cannot have been modified either.

The method according to the second aspect includes two options for obtaining the fingerprints of the data units, by direct computation or retrieval from the archive object. This supports the minimally destructive handling of the existing fingerprints during the editing phase (first aspect). The fact that each data unit represents at most one macroblock tends to limit the number of fingerprints that need to be archived for a given substitution request, which therefore limits the size of the archive object.

In some embodiments, the archive object further indicates the positions of the macroblocks that are represented by data units to which the archived fingerprints pertain. Put differently, an archived fingerprint is a fingerprint of a data unit, and the data unit represents (encodes) a macroblock, the position of which is indicated in the archive object. During the execution of the method according to the second aspect, to obtain the fingerprints of a data unit, it is determined, based on the positions indicated by the archive object, whether to compute the fingerprint or retrieve the fingerprint from the archive object.

A third aspect of the present disclosure relates to devices arranged to perform the method of the first aspect and/or the second aspect. These devices may be embedded in a system with a different main purpose (e.g., video recording, video content management, video playback) or they may be dedicated to said editing and validation, respectively. The devices within the third aspect of the disclosure generally share the effects and advantages of the first and second aspect, and they can be embodied with an equivalent degree of technical variation.

The invention further relates to a computer program containing instructions for causing a computer to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In a further aspect of the present disclosure, there is provided a signed video bitstream which includes data units and associated signature units. Each data unit represents at most N macroblocks in a video frame of the prediction-coded video sequence. Here, N is a small integer number, such as 1, 2, 3, 4, 5 or at most 10. Each signature unit includes a digital signature of a bitstring derived from a plurality of fingerprints of exactly one associated data unit each and optionally the bitstring itself. The signed video bitstream is suitable for editing since the direct effect of editing one macroblock is confined to the at most N data units of the edited macroblock, and since each fingerprint is a fingerprint of exactly one associated data unit. This restricts the propagation of the editing to a limited number of data units, so that fewer data units need to be re-signed after the editing.

It should be noted that as used in this disclosure, a "macroblock" may advantageously be an encoding macroblock. However, the invention is applicable also to video that is not prediction encoded and in a more generalized case, a macroblock can therefore be any contiguous group of pixels. As the signing of the video is done on decoded frames, the grouping of pixels need not be limited to any encoding group partitioning.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

In the terminology of the present disclosure, a "video bitstream" includes any substantially linear data structure, which may be similar to a sequence of bit values. A video bitstream can be carried by a transitory medium (e.g., modulated electromagnetic or optical waves), as in some streaming use cases, or the video bitstream can be stored on a non-transitory medium, such as a volatile or non-volatile memory.

The video bitstream represents a video sequence, which may be understood to be a sequence of video frames to be played back sequentially with nominal time intervals. Each video frame may be partitioned into macroblocks. In the present disclosure, further, a "macroblock" can be a transform block or a prediction block, or a block with both of these uses, in a frame of the video sequence. The usage of "frame" and "macroblock" herein is intended to be consistent with an H.26x video coding standard or similar specifications. A "macroblock" can furthermore be a coding block. As noted above, although the term macroblock is used, the grouping of pixels need not be limited to any partitioning used for encoding; rather, a macroblock may be any groups of neighboring pixels. When applied in the case of prediction-based encoding, it may be advantageous to use the same partitioning as used for the encoding.

Figure 1A:
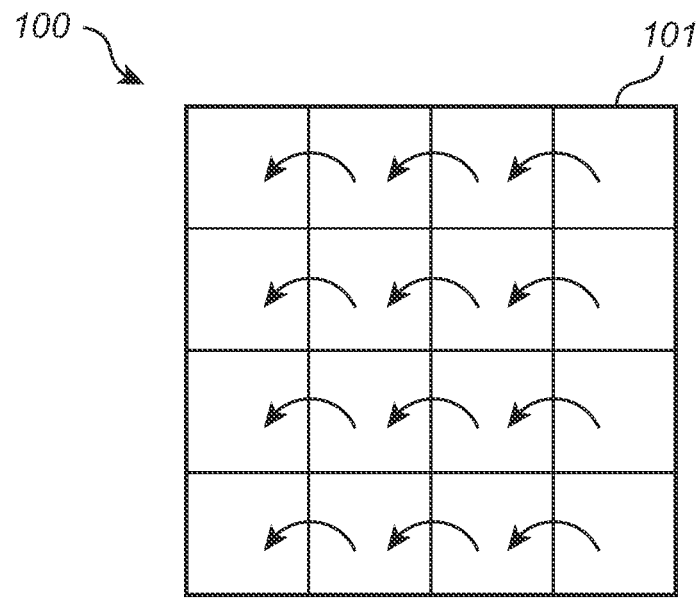
FIGS. 1A and 1B show two example patterns of intra-frame references within macroblocks in a video frame.
Figure 1B:
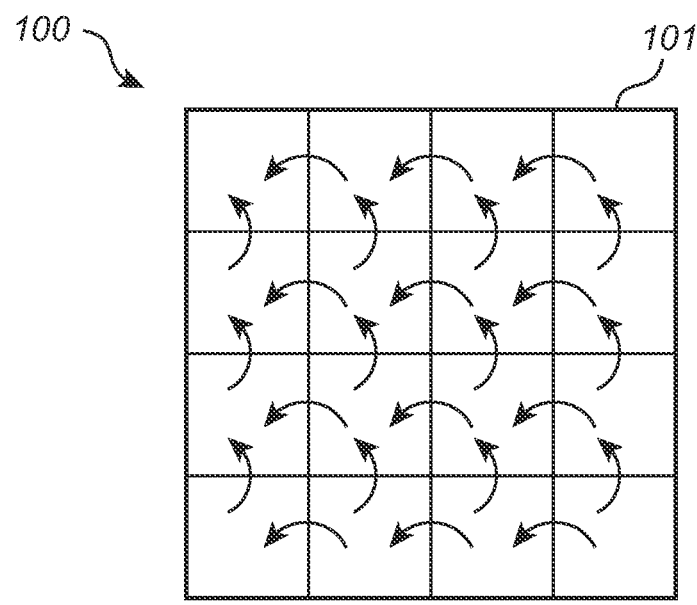

FIGS. 1A and 1B illustrate an example partition of a video frame 100 into a 4×4 uniform arrangement of macroblocks 101. It may be noted that this is a simplification for illustration purposes. In practice, a video frame 100 is generally partitioned into much larger numbers of macroblocks; for example, a macroblock could be 8×8 pixels, 16×16 pixels or 64×64 pixels. Curled arrows are consistently used herein to indicate an intra-frame or inter-frame reference to be used in prediction coding. Without departing from the scope of the present disclosure, the partition into macroblocks seen in FIGS. 1A and 1B can be varied significantly, to include non-square arrangements and/or arrangements of macroblocks 101 that are not homothetic to the video frame 100 and/or mixed arrangements of different macroblocks 101 that have different sizes or shapes. It is appreciated that some video coding formats support dynamic macroblock partitioning, i.e., the partition may be different for different video frames in a sequence. This is true, for example, of H.265.

In FIG. 1A, the pattern of intra-frame references is restricted to a single row of macroblocks 101. Indeed, each macroblock 101 refers to the macroblock to its immediate left (if it exists in the frame 100) in the sense that it is represented by a data unit that expresses the image data in the macroblock predictively, that is, the image data in this macroblock is expressed relative to the image data in the macroblock to the left. Conceptually, and somewhat simplified, the data unit expresses the macroblock 101 in terms of the change or movement relative to the left macroblock. Another possible understanding is that the data unit represents a correction of a predefined prediction operation that derives the macroblock 101 from the left macroblock. In an alternative within the scope of the present disclosure, a macroblock 101 may refer to another macroblock 101 to its right, or above or below it.

In FIG. 1B, the pattern of intra-frame references is denser. Here, each macroblock 101 refers to the macroblock to its immediate left (if it exists in the frame 100) and to the macroblock immediately above it (if it exists in the frame 100). Accordingly, the macroblock 101 is represented by a data unit that expresses the image data in the macroblock predictively, e.g., in terms of a difference, or in terms of a correction of a prediction of this image data based on a predefined interpolation operation (or some other predefined combination) acting on the image data in the left and upper macroblocks. The interpolation may include postconditioning operations such as smoothing. A further alternative, still within the scope of the present disclosure, is to use intra-frame references with directions opposite to that shown in FIG. 1B, i.e., starting in the lowest row.

An image/video format with a predefined pattern of intra-frame references can be associated with a specified scan order, which represents a feasible sequence for decoding the macroblocks. In FIG. 1A, the macroblock scan order is non-unique, namely, since each row can be decoded independently. For the pattern according to FIG. 1B, the macroblocks can be decoded either row-wise from above or column-wise from the left; a video format with this reference pattern may specify a column-wise or row-wise scan order, so that any reconstruction errors can be anticipated on the encoder side, which benefits coding efficiency. Further, there exist video formats with arbitrary macroblock ordering or so-called slicing.

Figure 2:
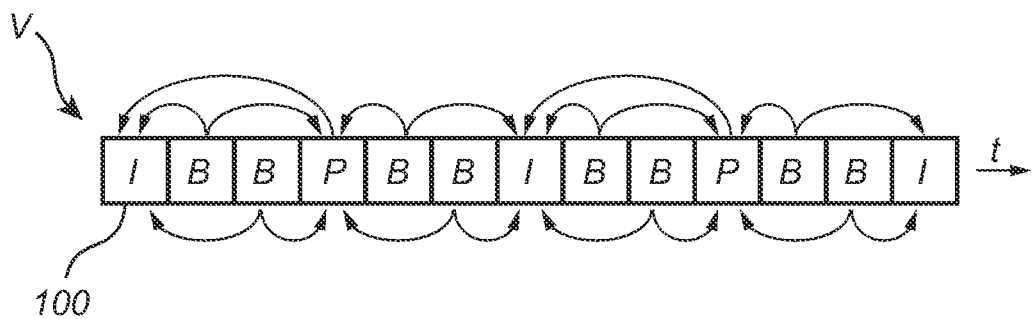
FIG. 2 shows a sequence of frames representing one group of pictures (GoP) with an example pattern of inter-frame references.

FIG. 2 shows a video sequence V including a sequence of frames 100. There are independently decodable frames (I-frame) and predictive frames in the video sequence V, including unidirectionally predictive frames (P-frame) and bidirectionally predictive frames (B-frame). Recommendation ITU-T H.264 (June 2019) "Advanced video coding for generic audiovisual services", International Telecommunication Union, specifies a video coding standard in which both forward-predicted and bidirectionally predicted frames are used. As seen in FIG. 2, the independently decodable frames do not refer to any other frame. The unidirectionally predictive frames (P-frames) in FIG. 2 are forward-predicted in that they refer directly to at least one other preceding or immediately preceding frame. The bidirectionally predictive frames (B-frames) can additionally refer directly to a subsequent or immediately subsequent frame in the video sequence V. A first frame refers indirectly to a second frame if the video sequence includes a third frame (or subsequence of frames) to which the first frame refers directly and which, in turn, refers directly to the second frame. In predictive video coding, a group of pictures (GoP) is defined as a subsequence of video frames that do not refer to any video frame outside the subsequence; it can be decoded without reference to any other I-, P- or B-frames. The video frames in FIG. 2 form a GoP. The GoPs in FIG. 2 are minimal since they cannot be subdivided into further GoPs.

In simpler implementations, a video sequence V may consist of independently decodable frames (I) and unidirectionally predictive frames (P) only. Such a video sequence may have the following appearance: IPPIPPPPIPPPIPPP, where each P-frame refers to the immediately preceding I- or P-frame. The following GoPs can be discerned in this example: IPP, IPPPP, IPPP, IPPP.

There are several options for coordinating inter-frame and intra-frame prediction coding. For example, if a static (fixed) macroblock partition is used in all video frames, the inter-frame references like those exemplified may be defined at the level of one macroblock position (e.g., upper left macroblock in FIGS. 1A and 1B) at a time. Some video formats allow dynamic macroblock partitions, e.g., a macroblock can be predicted either from the corresponding pixels in a preceding video frame or from spatially shifted pixels in the preceding frame. Alternatively, the inter-frame references are defined for entire video frames. An I-frame consists of I-blocks only, whereas a P-frame may consist of only P-blocks or a mixture of I-blocks and P-blocks.

Turning to FIG. 3, attention will now be directed to the video bitstream that encodes the video sequences under consideration. FIGS. 3A, 3B, 3C and 3D illustrate different correspondence patterns between data units 102 and the macroblocks 101 that they represent (encode). For purposes of the present disclosure, a data unit may have any suitable format and structure; no assumption is being made other than that the data unit can be separated (or extracted) from the video bitstream, e.g. to allow for processing, without any need to decode that data unit or any surrounding data units. A signed video bitstream further includes, in addition to the data units, signature units that are separable from the signed video bitstream in a same or similar manner. Details about signature units will be presented below with reference to FIG. 5A.

Figure 3A:
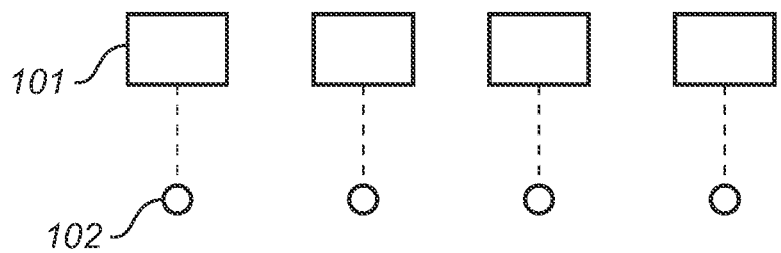
FIGS. 3A-3D show four example correspondence patterns between data units and the macroblocks that they represent.

Under one option, as illustrated in FIG. 3A, the data units 102 are in a one-to-one correspondence (dashed lines) to the macroblocks 101. This correspondence pattern allows each macroblock 101 to be always reconstructed from one data unit 102. Further, no other data unit 102 than the corresponding data unit 102 needs to be modified if a macroblock 101 is edited (although, certainly, modifications to signature units, metadata and the like may be necessary).

Figure 3B:
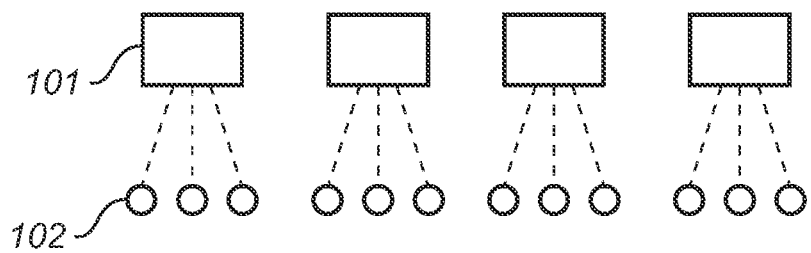

Alternatively, as illustrated in FIG. 3B, each macroblock 101 is encoded by multiple data units 102. Still each data unit 102 represents at most one macroblock 101. Therefore, if each macroblock 101 is encoded by at most M data units 102, then it follows that any macroblock 101 can be reconstructed from at most M data units 102. An edit made to a macroblock 101 has a direct effect on at most M data units 102. It is assumed that M is a small integer number, such as 1, 2, 3, 4, 5 or at most 10.

Figure 3C:
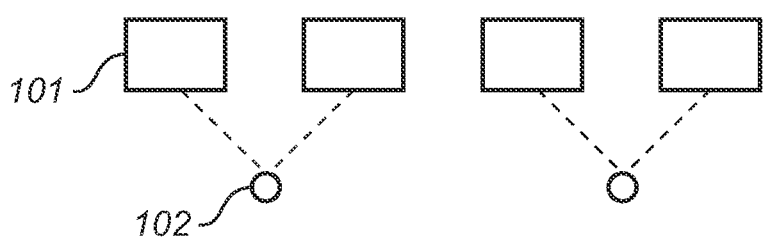

Under a further option, as illustrated in FIG. 3C, each data unit 102 encodes multiple macroblocks 101. This means that the effects of an edit made to a macroblock 101 are not limited to the macroblock 101 itself, but it may become necessary to re-encode and/or re-sign a data unit 102 that the edited macroblock 101 shares with a further macroblock 101. Because it may be computationally wasteful to perform the re-signing on an unnecessarily large data set, this correspondence pattern is not applied in the best-performing embodiment in the present disclosure though quite possible to implement. The total added computational effort may be kept limited if a data unit 102 is allowed to be shared by at most a predefined number N of macroblocks 101. Again, N may be specified to be a small integer number, such as 1, 2, 3, 4, 5 or at most 10

Combinations of the patterns seen in FIGS. 3B and 3C are possible within the scope of the present disclosure. As a result, the techniques proposed herein can be applied to video bitstream where the ratio of macroblocks 101 to data units 102 may be 2:1, 1:1, 2:2, 3:3, 4:2, 2:4 or 4:4.

Figure 3D:
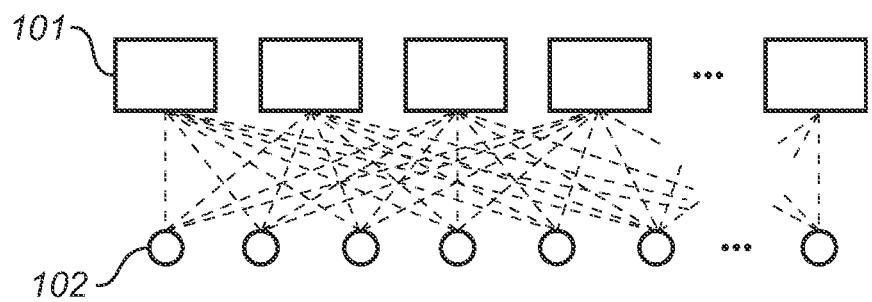

Under a still further option, as illustrated in FIG. 3D, each data unit 102 is allowed to represent any number of macroblocks 101 in the video sequence, and each macroblock 101 may be encoded by any number of data units 102. This correspondence pattern, as suggested by the dashed lines, could at worst imply that even a limited edit operation on a macroblock 101 will necessitate complete re-encoding and re-signing of the video sequence. The techniques disclosed herein are not to be practiced on video sequences with the structure shown in FIG. 3D.

Figure 4:
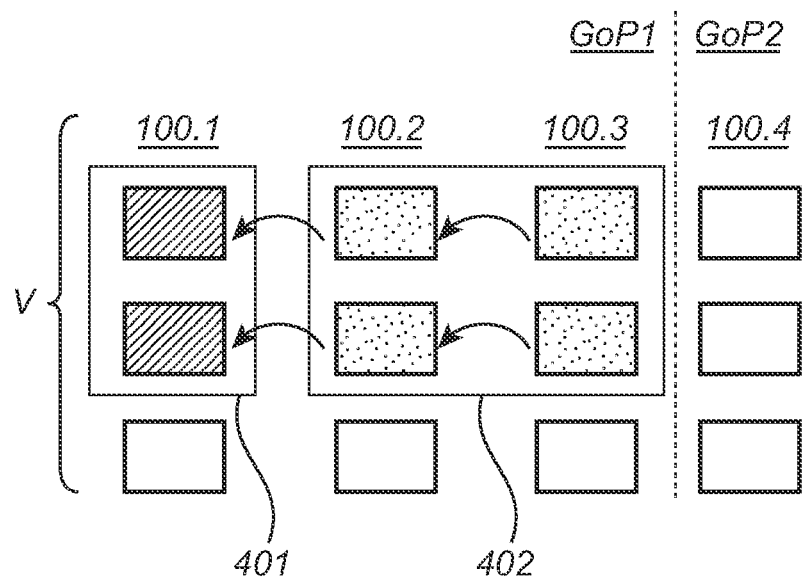
FIG. 4 illustrates an editing operation that directly affects some macroblocks in a first frame (first column) and leads to consequential changes in further frames (second and third columns) up until the end of the GoP.

FIG. 4 illustrates an editing operation to be described below.

Figure 5A:
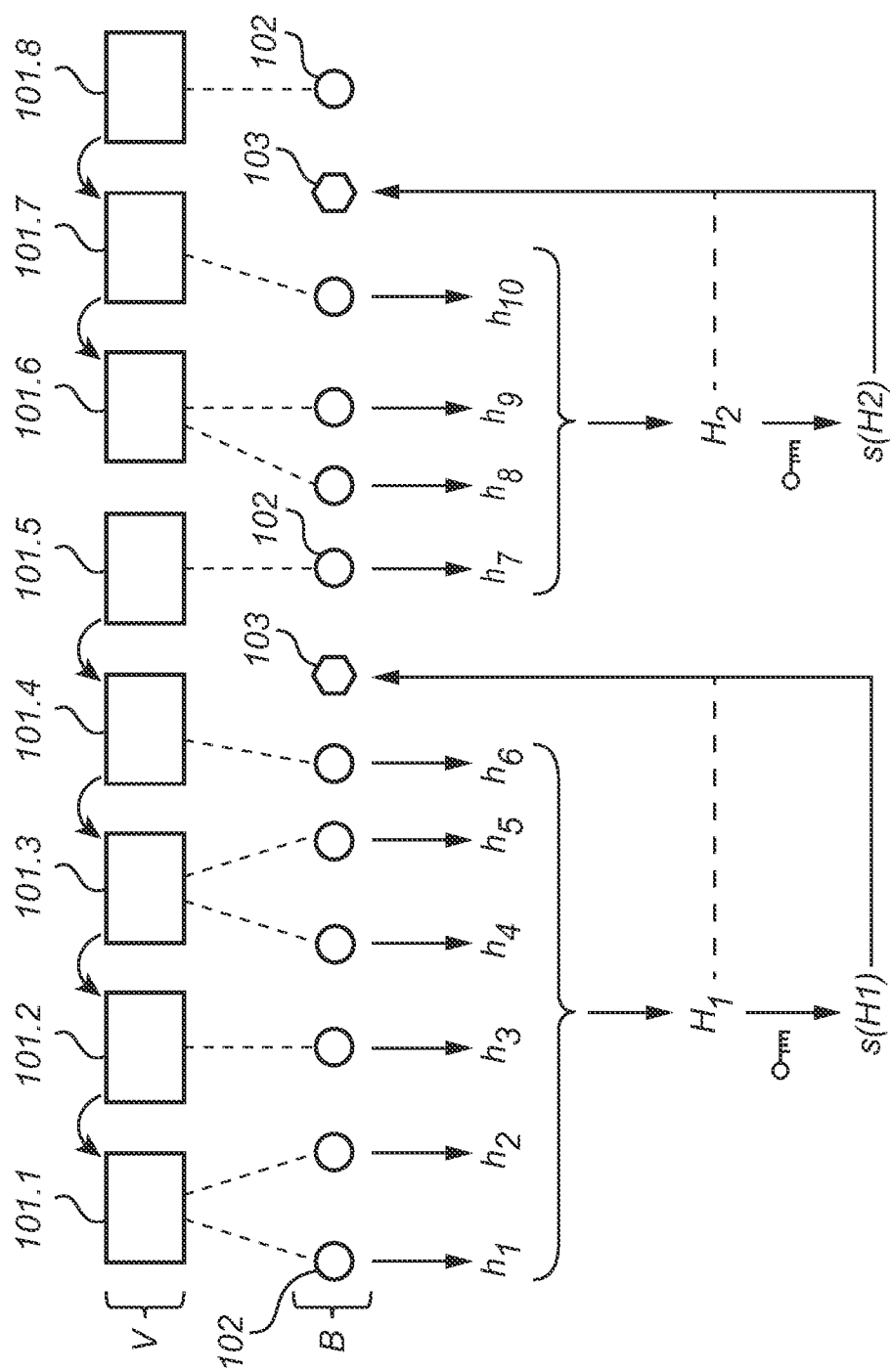
FIG. 5A shows a video sequence in a condition prior to editing (upper half) together with a signed video bitstream that includes data units and associated signature units (lower half)

FIG. 5A depicts a section of a video sequence V including a succession of macroblocks 101 belonging to one or more video frames. For example, the macroblocks 101 may occupy a fixed position (e.g., upper left macroblock in FIGS. 1A and 1B) in consecutive video frames. The macroblocks 101 are assumed to have been predictively coded in accordance with the references indicated by curly arrows. The video sequence V is encoded as a signed video bitstream B which includes data units 102 and signature units 103. For purposes of illustration, not limitation, FIG. 5A shows the data units 102 such that they encode the video macroblocks 101 in accordance with a correspondence pattern that may be described as a hybrid of the patterns shown in FIGS. 3A and 3B and allowing a regular or irregular alternation between these (e.g., based on macroblock size, wherein a larger macroblock 101 corresponds to multiple data units 102, while a smaller or more compressed macroblock 101 corresponds to a single data unit 102). Nonetheless, each data unit 102 represents at most one macroblock 101. The data units 102 may be in accordance with a proprietary or standardized video coding format, such as ITU-T H.264, H.265 or AV1. The bitstream B may further include, without departing from the scope of the present disclosure, additional types of units (e.g., dedicated metadata units).

Each of the signature units 103 can be associated with a plurality of data units 102. In FIG. 5A, it is understood that the data units 102 between two consecutive signature units 103 are associated with the later signature unit 103; this is not an essential feature of the invention, and other conventions are possible without departing from the scope of this disclosure. A signature unit 103 could be associated with a set of data units 102 that are all contained in one GoP, but other association patterns—like the one seen in FIG. 5A—are possible as well. Further, the set of data units 102 to be associated with one signature unit 103 is preferably selected in view of an applicable macroblock scan order. For instance, the set of data units 102 associated with a signature unit 103 could represent a number of macroblocks that are to be sequentially scanned during decoding, whereby the number of macroblocks that need to be revisited if a signature unit 103 fails to validate is minimized.

The signature unit 103 includes at least one bitstring (e.g., $H_1$) and a digital signature of the bitstring (e.g., $s(H_1)$). The presence of the bitstring is optional, as suggested by the use of dashed line. In the case where a signature unit 103 includes multiple bitstrings, the signature unit 103 may have one digital signature for all of these bitstrings, or multiple digital signatures for single bitstrings each or for subgroups of bitstrings each. The bitstring from which the digital signature is formed may be a combination of fingerprints of the associated data units 102 or it may be a fingerprint of said combination of fingerprints of the associated data units 102. The combination of the fingerprints (or 'document') may be a list or other concatenation of string representations of the fingerprints. In the ITU-T H.264 and H.265 formats, the signature unit may be included as a Supplemental Enhancement Information (SEI) message in the video bitstream. In the AV1 standard, the signature may be included in a Metadata Open Bitstream Unit (OBU).

Each of the fingerprints may be a hash or a salted hash. A salted hash may be a hash of a combination of the data unit (or a portion of the data unit) and a cryptographic salt; the presence of the salt may stop an unauthorized party who has access to multiple hashes from guessing what hash function is being used. Potentially useful cryptographic salts include a value of an active internal counter, a random number, and a time and place of signing. The hashes may be generated by a hash function (or one-way function) h, which is a cryptographic function that provides a safety level considered adequate in view of the sensitivity of the video data to be signed and/or in view of the value that would be at stake if the video data was manipulated by an unauthorized party. Three examples are SHA-256, SHA3-512 and RSA-1024. The hash function shall be predefined (e.g., it shall be reproducible) so that the fingerprints can be regenerated when the recipient is going to verify the fingerprints. In the example of FIG. 5A, the bitstrings are given by $$H_1 = h([h_1, h_2, h_3, h_4, h_5, h_6])$$

and $$H_2 = h([h_7, h_8, h_9, h_{10}]),$$

where $h_1, h_2, \ldots$ are hashes of the data units and [·] denotes concatenation. Example salted hashes can be defined as $$H'_1 = h([h_1, h_2, h_3, h_4, h_5, h_6], \sigma)$$

or $$H''_1 = h([h_1, h_2, h_3, h_4, h_5, h_6, \sigma]),$$

where $\sigma$ is the cryptographic salt. In the first example, the hash function h has a parametric dependence on the second argument, to which the salt $\sigma$ has been assigned.

In some embodiments, each of the fingerprints $h_1$, $h_2, \ldots$ is computed from the data unit 102 directly, e.g., from coded transform coefficients or other video data therein. The fingerprint may be computed from the entire data unit or from a subset thereof that has been extracted according to a pre-agreed rule. In other embodiments, the fingerprints $h_1$, $h_2, \ldots$ are computed from a reconstructed macroblock obtained by decoding the data unit 102, e.g., pixel values or other plaintext data. In still other embodiments, the fingerprints $h_1, h_2, \ldots$ are computed neither on plaintext level or bitstream level, but instead from intermediate reconstruction data derived from the data unit. More precisely, if an encoder is used that comprises a frequency-domain transformation (e.g., DCT, DST, DFT, wavelet transform) followed by a coding process (e.g., entropy, Huffman, Lempel-Ziv, run-length, binary or non-binary arithmetic coding, such as context-adaptive variable-length coding, CAVLC, context-adaptive binary arithmetic coding, CABAC), the transform coefficients will normally be available as intermediate reconstruction data at the decoder side. The transform coefficients can be restored from the coded representation. If the encoder further includes a quantization process immediately downstream of the transformation, the quantized transform coefficients will be available at the decoder side. In more complex codecs, with a greater number of sequential processing stages, there may be further types of intermediate reconstruction data, and these may be used for the fingerprint computation. It is particularly convenient to use a type of intermediate reconstruction data which, like the quantized transform coefficients, appears identically in the encoding process. Common to all the embodiments reviewed in this paragraph, a fingerprint pertains to exactly one data unit 102 associated with the signature unit 103.

Optionally, to discover unauthorized removal or insertion of data units, the fingerprints can be linked together sequentially. This is to say, each fingerprint has a dependence on the next or previous fingerprint, e.g., the input to the hash includes the hash of the next or previous fingerprint. The linking can for example be realized as follows: $h_1 = h(X_{102.1})$, $h_2 = h([h_1, X_{102.2}])$, $h_3 = h([h_2, X_{102.3}])$ etc., where $X_{102.1}$, $X_{102.2}$, $X_{102.3}$ denote data from a first, second and third one of the data units 102.

Still with reference to the signature units 103 in FIG. 5A, to generate the digital signature $s(H_1)$, a cryptographic element (not shown) with a pre-stored private key may be utilized. The recipient of the signed video bitstream may be supposed to hold a public key belonging to the same key pair (see also FIG. 10), which enables the recipient to verify that the signature produced by the cryptographic element is authentic but not generate new signatures. The public key could also be included as metadata in the signed video bitstream, in which case it is not necessary to store it at the recipient side.

Figure 6:
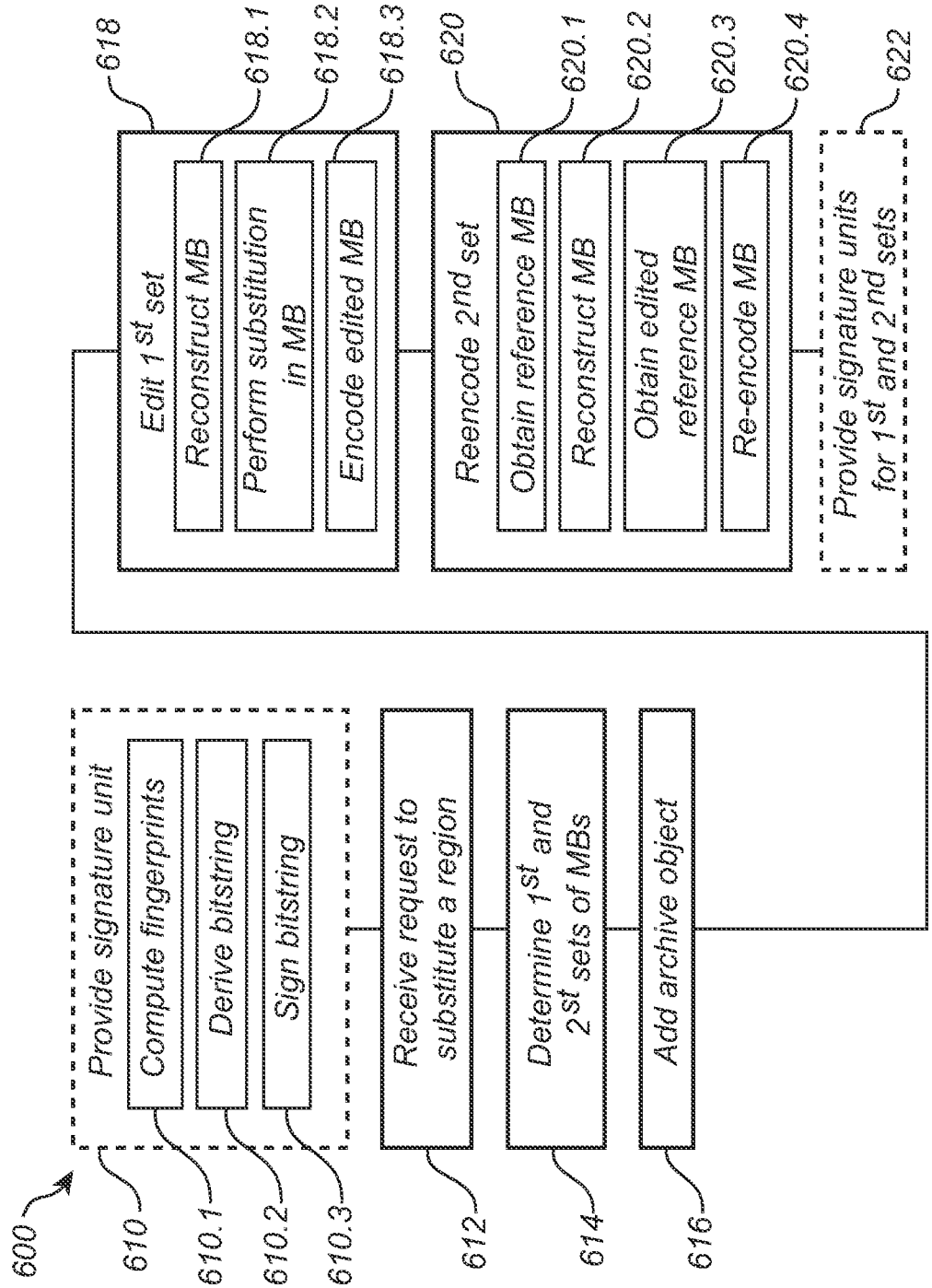
FIG. 6 is a flowchart of a method of editing a signed video bitstream, according to embodiments herein.

With reference to FIG. 6, there will now be described a method 600 of editing a signed video bitstream B obtained by prediction coding of a video sequence V. It is assumed that the non-optional steps of the method 600 are performed after the original signing of the video bitstream. For example, if the signed video bitstream is originally generated at a recording device, the editing method 600 may be performed in a video management system (VMS). Another example use case is where the signed video bitstream is generated at a device, is stored in memory and is then revisited for editing using the same device. The editing may take place at a later point in time, e.g., after a need to perform privacy masking has become known.

Figure 8:
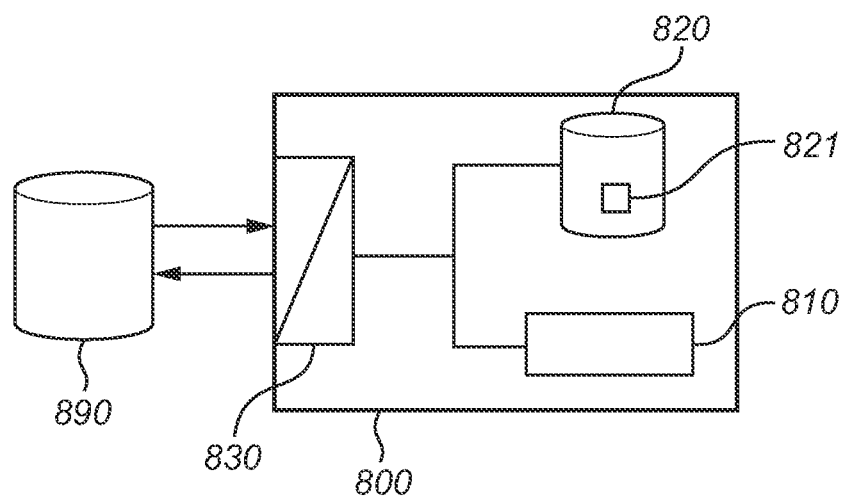
FIG. 8 shows a device suitable for performing the methods illustrated in FIGS. 6 and 7.

Although, as noted, the device performing the editing method 600 may be an application or system dedicated for a particular purpose, it may have the basic functional structure shown in FIG. 8. As illustrated, device 800 includes processing circuitry 810, memory 820 and an external interface 830. The memory 820 may be suitable for storing a computer program 821 with instructions implementing the editing method 600. The external interface 830 may be a communication interface allowing the device 800 to communicate with an analogous device (not shown) held by a recipient and/or a video content author (e.g., a recording device), or it may allow read and write operations in an external memory 890 suitable for storing video bitstreams.

Figure 9:
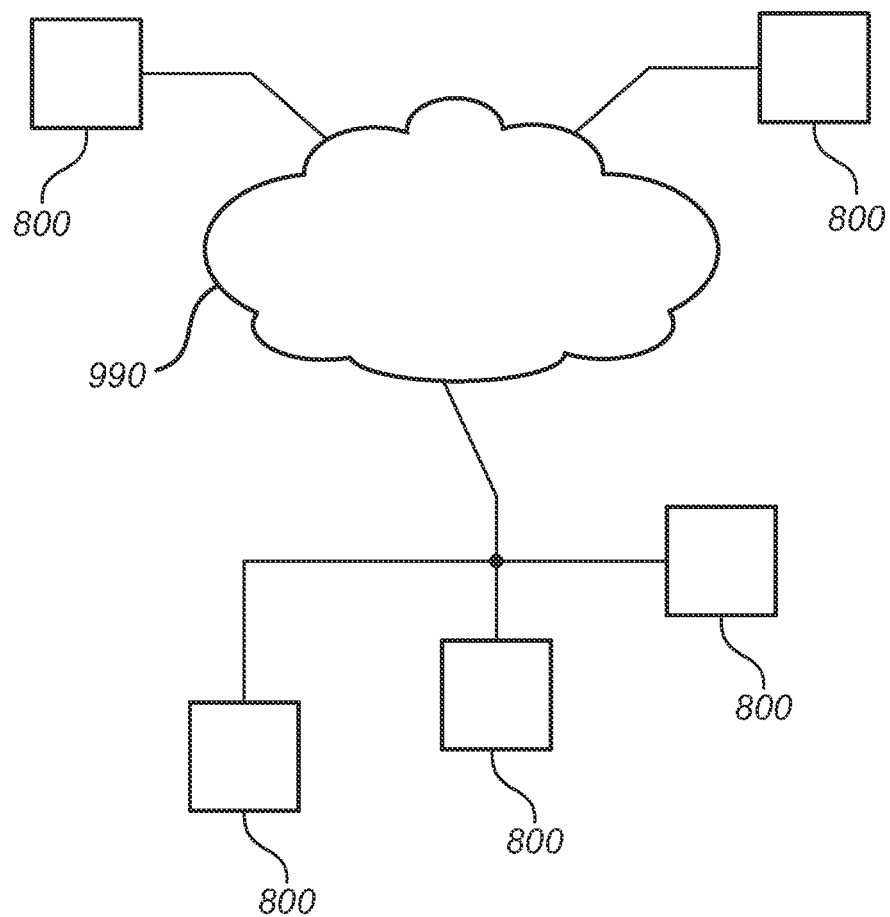
FIG. 9 shows a number of such devices, which are connected over a local-area and/or a wide-area network.

FIG. 9 illustrates the case where a bitstream is transferred among multiple devices. It is noted that the device performing the editing method 600 may be connected to the recipient device over a local-area network (connection lines in lower half of FIG. 9) or over a wide-area network 990. Attacks on the bitstream B can occur on either type of network, which justifies the signing.

Returning to FIG. 6, one embodiment of the method 600 begins with a step 612 of receiving a request to substitute a region of at least one video frame 100 in a video sequence V. The request may be received via a human-machine interface from a human operator or in an automated way, e.g., in a message from a control application executing on the same device 800 or remotely. The region to be substituted may be a set of substitute pixel values, such as a privacy mask, which is to replace analogously located pixels in the video sequence V.

For the avoidance of doubt, it is noted that the video sequence V to be edited is encoded by prediction coding as a signed video bitstream B, which includes, data units 102 and associated signature units 103, wherein each data unit represents at most one macroblock 101 in a video frame 100 of the prediction-coded video sequence V, and wherein each signature unit includes a digital signature of a bitstring derived from a plurality of fingerprints of exactly one associated data unit each. Such a bitstream format has been exemplified with reference to FIG. 5A.

In a next step 614 of the method 600, a first set of macroblocks, in which said region is contained, and a second set of macroblocks referring directly or indirectly to macroblocks in the first set are determined. Recalling that bidirectionally predictive frames (B-frames) can be defined in some video coding formats, it is appreciated that the second set of macroblocks can be located before or after the first set of macroblocks, or occupy both of these locations. It is understood that the first and second sets are defined to be disjoint. For example, it may be stipulated that a macroblock belongs to the second set only if it does not belong to the first set, i.e., only if this macroblock is not needed in order to form a set of macroblocks that contains the region to be substituted. It follows that the second set of macroblocks is normally empty if the first set of macroblocks extends up to the boundary of a GoP. It is appreciated, further, that the second set of macroblocks may contain macroblocks in more than one P-frame or more than two B-frames since, depending on the video encoder initially used, additional frames may use the substituted region as reference.

If the region to be substituted is limited to a single video frame, the first set of macroblocks can be determined with reference only to the macroblock partition of the frame. More precisely, the first set is all macroblocks with which the region overlaps (that is, the macroblocks with which the region has a non-empty intersection in pixel space). If the region extends to multiple frames, this operation is repeated for each frame. In the special case where the region repeats identically in all of the video frames and additionally the macroblock partition is constant across all said frames, the first set of macroblocks is a copy of those determined (by the overlap criterion) for the initial frame for each of the following frames. The second set of macroblocks can be determined on the basis of the first set and the pattern of intra-frame and inter-frame references in the signed prediction-coded video sequence. Because such references by definition do not extend past GoP boundaries, the search for macroblocks to be included in the second set can be restricted to that GoP or those GoPs to which the first set of macroblocks belong.

A possible outcome of step 614 is illustrated in FIG. 4, where each column represents one video frame of a video sequence V and each row represents one macroblock at a particular position in the frame (e.g., upper left macroblock). In FIG. 4, further, references between macroblocks have been indicated as curled arrows, and a boundary between two consecutive GoPs, GoP1 and GoP2, has been shown as a dashed vertical line. It is noted that the inter-frame references are defined at the level of one macroblock positions in FIG. 4. Further, the diagonally hashed macroblocks are those directly affected by the request to substitute the region; they are all located in the 1$^{st}$ frame and form the first set 401 of macroblocks. The macroblocks with dotted shading are all macroblocks that refer directly (2$^{nd}$ frame) or indirectly (3$^{rd}$ frame) to the macroblocks in the first set, and they are identified as the second set 402 of macroblocks. In line with expectation, the second set of macroblocks does not extend past the GoP boundary.

It is noted that the composition of the first and second sets of macroblocks seen in FIG. 4 could be altered if an intra-frame reference is introduced but not necessarily. For example, if the macroblock position corresponding to the first row refers to the macroblock position corresponding to the second row, the first and second sets of macroblocks 401, 402 would remain unchanged.

Figure 5B:
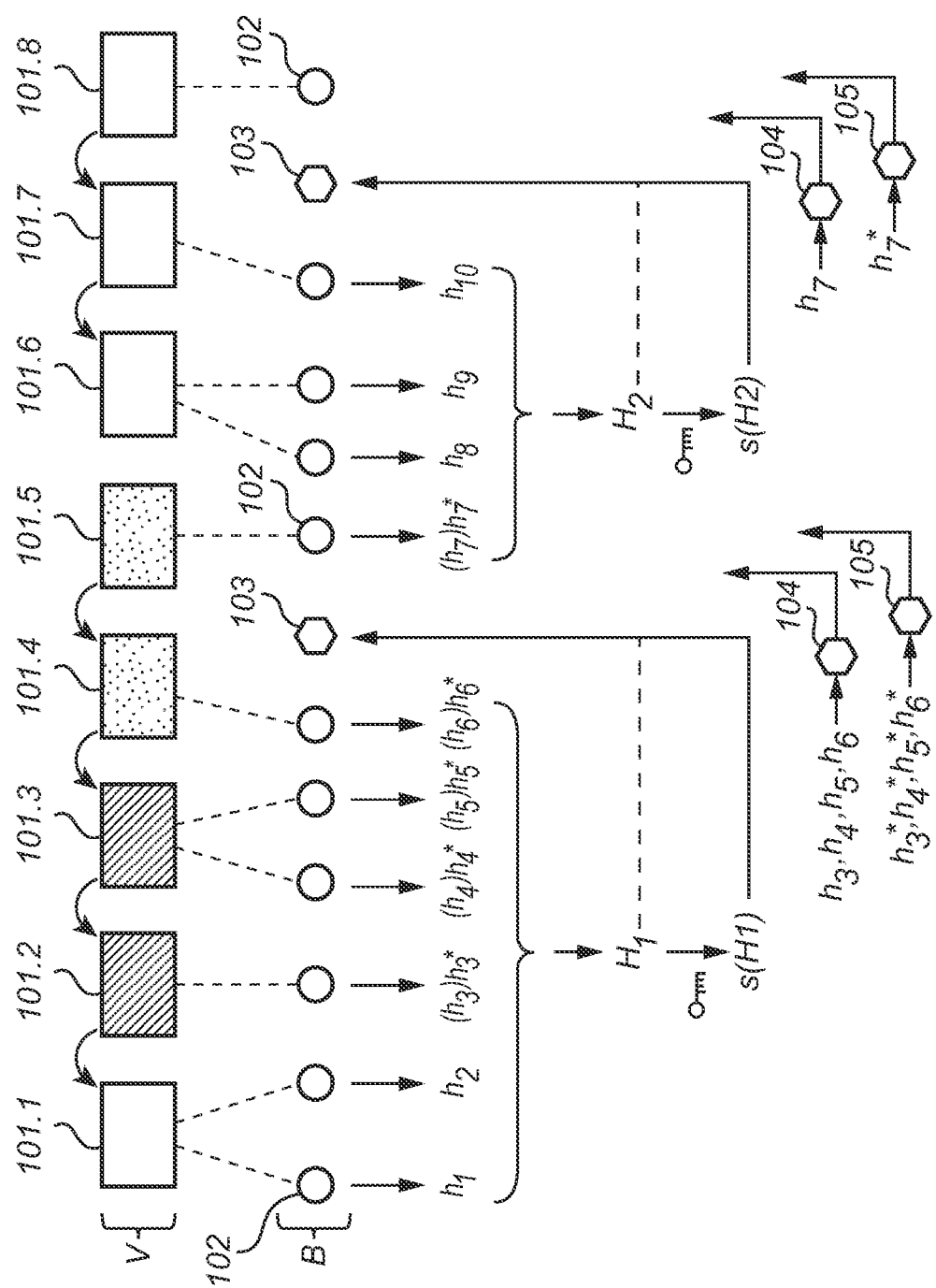
FIG. 5B shows the same video sequence and signed video bitstream after the editing.

A next step 616 of the method 600 will be illustrated with respect to FIG. 5B, which shows the video sequence V and the signed video bitstream B after the substitution of the region has been carried out. In FIG. 5B, diagonal hashing is used for the first set of macroblocks 101.2, 101.3, and dotted shading is used for the macroblocks 101.4, 101.5 in the second set of macroblocks.

In step 616, an archive object 104 is added to the signed video bitstream B. The archive object 104 includes fingerprints of a first and a second set of data units, namely, the data units which respectively represent the first and second set of macroblocks determined in step 614. It is preferable though not strictly necessary that the fingerprints are individual fingerprints pertaining to exactly one data unit each. In implementations where the fingerprints are computed from macroblocks reconstructed from the data units, which is one of the options mentioned above, and the re-encoding is expected to faithfully preserve these macroblocks, then the fingerprints of the second set of data units need not be included in the archive object 104. At the level of the signed video bitstream B, the archive object 104 has a similar format as the data units 102 and signature units 103, in that the archive object 104 can be separated from the video bitstream without decoding.

In FIG. 5B, the first set of data units corresponds to the third, fourth and fifth data units 102, and the second set of data units corresponds to the sixth and seventh data units 102. Accordingly, the (two) archive objects 104 added to the signed video bitstream B in step 616 will together store fingerprints $h_3$, $h_4$, $h_5$, $h_6$, $h_7$. Optionally, each archive object 104 may include a digital signature of these fingerprints, or a digital signature of a combination of these fingerprints in this archive object 104, or it may include a digital signature of a fingerprint of said combination. Further optionally, the archive objects 104 may as well include positions of the first and second sets of macroblocks, the signatures of which have been archived. A position may refer to the macroblock's position in a frame, e.g., in frame coordinates, and this in turn corresponds to a position in the bitstring. If a static macroblock partition is used, the position of a macroblock 101 can be expressed as a macroblock sequence number or another identifier. For example, the bitstring may be formed by concatenating the fingerprints in the same order as the macroblock sequence in a frame.

The execution flow of the editing method 600 then proceeds to step 618, where the first set of data units are edited in accordance with the request to substitute the region. In other words, step 618 leaves the signed video bitstream B with some data units replaced or modified.

In some embodiments, step 618 may include decoding 618.1 the data unit into a reconstructed macroblock; providing 618.2 an edited macroblock by performing the requested substitution on the reconstructed macroblock; and providing 618.3 an edited data unit by encoding the edited macroblock.

Optionally, the macroblock resulting after the substitution 618.2 (e.g., macroblocks 101.2 and 101.3 in FIG. 5B) may be encoded as an independently decodable data unit. The independently decodable data unit may correspond to an I-frame in the H.264 or H.265 coding specifications, an encoded macroblock that does not refer to another macroblock, or data units equivalent to these. This is in line with the realization that the substitution introduces a sudden temporal change in the video sequence, which could lessen performance of the prediction coding.

In a next step 620 of the method 600, the second set of data units is re-encoded. A generally desirable aim is for the re-encoded second set of data units to decode into macroblocks resembling as closely as possible the (original) second set of macroblocks. With reference to the decoder application, the aim is for the re-encoded second set of data units to produce a near-identical reference buffer content and/or a near-identical decoder state. However, while the macroblocks in the second set (e.g., macroblocks 101.4 and 101.5 in FIG. 5B) shall be unchanged, they contain references to the macroblocks in the first set, which generally become unusable when the first set of macroblocks change. Because of the sudden temporal change introduced by the editing, the first set of macroblocks ceases to provide a promising basis for predicting the second set of macroblocks. The re-encoding 620 may be facilitated by the optional substep 618.1, which outputs a reconstructed macroblock, based on which the second set of macroblocks can be reconstructed, namely, by decoding the second set of data units.

The second set of macroblocks may advantageously be re-encoded 620 using reduced data compression. This is to be understood against the background that the video sequence V is encoded at a predetermined regular level data compression. More precisely, it is foreseen that the second set of macroblocks are encoded at a reduced level of data compression in comparison with the regular data compression.

To encode the second set of macroblocks in step 620, the main options are non-predictive coding and predictive coding. If non-predictive coding is used, the second set of macroblocks are encoded in independently decodable form, as intra-coded blocks, also referred to as I-blocks. The coded second set of macroblocks will thus be represented by independently decodable data units. Under this option, it is furthermore possible to use non-lossy coding for the second set of macroblocks; for example, the second set of macroblocks may be represented by unencoded, 'raw' blocks, such as a plain list of the original values for each position in the macroblock in appropriate color space.

Under the second option, predictive coding, step 620 may be executed by re-encoding the second set of data units using prediction coding with reference to the edited first set of data units. More precisely, applying step 620 to a data unit may include: obtaining 620.1 a macroblock reconstructed from a further data unit, to which said data unit refers directly; decoding 620.2 said data unit using the reconstructed macroblock; obtaining 620.3 a reconstructed edited version of the macroblock; and providing 620.4 an edited data unit by re-encoding said data unit by prediction coding with reference to the reconstructed edited version of the macroblock. Substep 620.1 may include decoding the further data unit (see step 618.1), and the further data unit can belong to the first or second set of data units. In substep 620.3, the reconstructed edited version of the macroblock may correspond to the image data produced in substep 618.2 above, that is, by performing the requested substitution on the reconstructed macroblock. Substep 620.4 may include expressing the macroblock in the second set (i.e., the macroblock which is being processed) in terms of a difference or correction relative to the reconstructed edited version of the macroblock (which originated from said further data unit). As mentioned, this option is mainly useful if the edits performed in the first set of macroblocks are relatively limited, or else the prediction coding might not perform satisfactorily.

In an optional final step 622 of the method 600, one or more signature units 105 associated with the edited first set of data units and the re-encoded second set of data units are provided in the signed video bitstream B. The signature units 105 provided in step 622 may have the same structure as the signature units 103 described above. Accordingly, the signature unit 105 may include a bitstring derived from fingerprints of one edited data unit each and a digital signature of this bitstring, or the signature unit 105 may include the digital signature only. A signature unit 105 provided in step 622 may be a newly generated signature unit, as suggested in FIG. 5B. Alternatively, the signature unit 105 is provided by editing an existing signature unit, notably by extending it with a further digital signature.

As already mentioned, steps of any method disclosed herein do not have to be performed in the exact order described, unless explicitly stated. This is illustrated notably by the editing method 600, wherein it is clearly possible to perform step 616 before, between or after the subsequence of steps 618 and 620, as desired.

In some embodiments, the method 600 further includes an initial step 610 of providing at least one signature unit 103. It is understood that, in use cases believed to be of primary interest, step 610 is performed by a different entity than steps 612, 614, 616, 618, 620 and 622 of the method 600, and/or step 610 is performed at an earlier point in time. Either way, step 610 is separated from the subsequent steps 612, 614, 616, 618, 620 and 622 by a relatively unsecure data transfer and/or a storage period that justifies signing to ensure the desired level of data security.

The optional step 610 may comprise the substeps of computing 610.1 a plurality of fingerprints of respective data units associated with the signature unit; deriving 610.2 a bitstring from the plurality of fingerprints; and obtaining 610.3 a digital signature of the bitstring, wherein the bitstring is a combination of said plurality of fingerprints or a fingerprint of said combination. Suitable implementations of the fingerprint computation 610.1, the bitstring derivation 610.2 and the digital signing 610.3 have been discussed in detail above. In particular, the bitstring to which the digital signature in the signature unit 103 pertains may be a combination of fingerprints of the associated data units 102, or it may be a fingerprint of said combination of fingerprints of the associated data units 102. The combination (or 'document') may be a list or another concatenation of respective string representations of the fingerprints.

Figure 7:
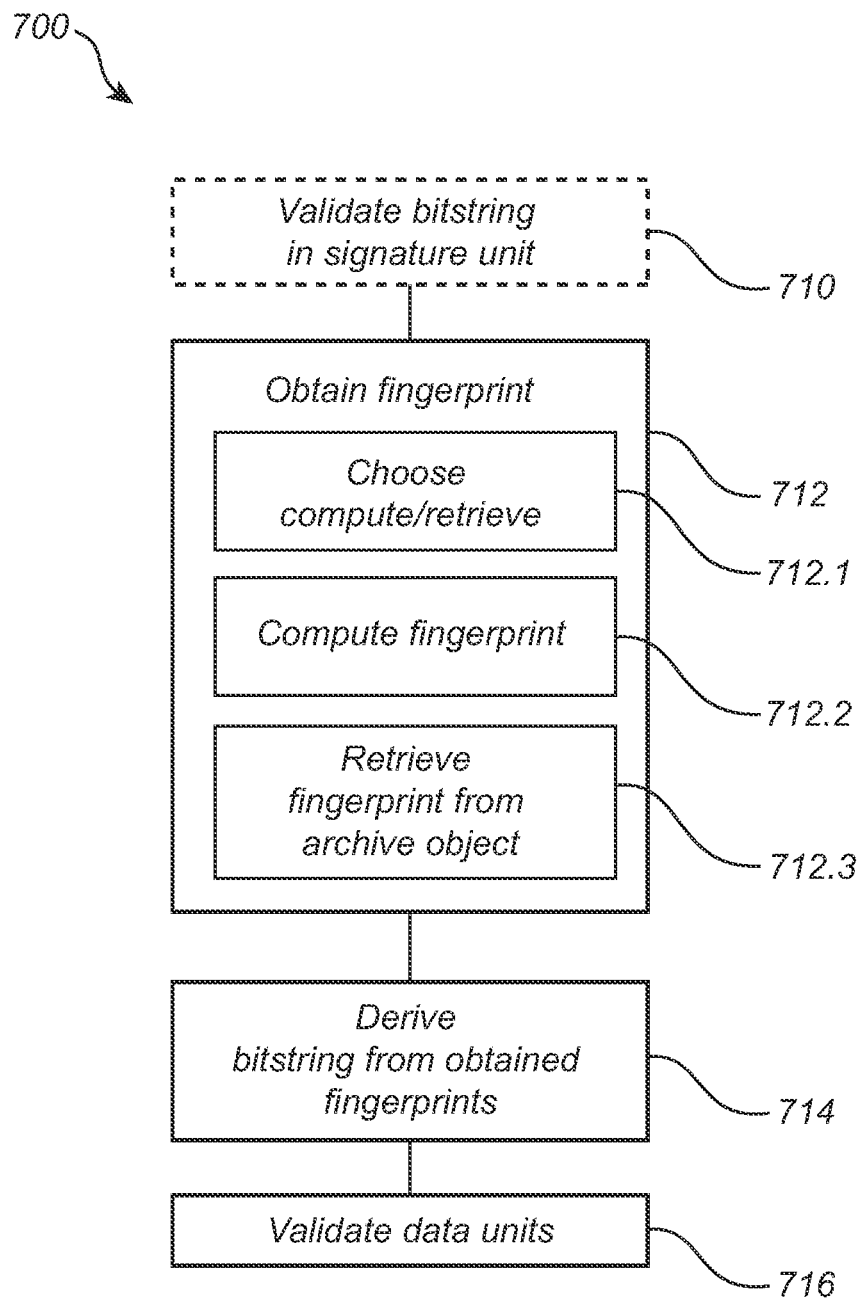
FIG. 7 is a flowchart of a method of validating a signed video bitstream, according to embodiments herein.

Having thus completed the description of the editing method 600, attention is now directed to the recipient side. More precisely, with reference to the flowchart in FIG. 7, a method 700 of validating a signed video bitstream B will be described. It is again assumed that the signed video bitstream B has been obtained by prediction coding of a video sequence V and, optionally, by subsequent editing operations. It is not essential that the signed video bitstream B has been processed according to the editing method 600. It is moreover assumed that the signed video bitstream includes data units 102, associated signature units 103 and an archive object 104. Here, each data unit 102 represents at most one macroblock 101 in a frame 100 of the prediction-coded video sequence V, each signature unit 103 includes a digital signature (e.g., $s(H_1)$, $s(H_2)$) of a bitstring (e.g., $H_1$, $H_2$) and optionally the bitstring itself, and the archive object 104 includes at least one fingerprint, which may be an archived fingerprint of a data unit that is now absent from the bitstream B and/or has undergone editing. It is irrelevant for the validation method 700, and usually not possible to determine at the recipient side, whether a particular signature unit 103 was added in connection with editing (e.g., by the editing method 600) or it was part of the original, not-edited bitstream B.

Figure 10A:
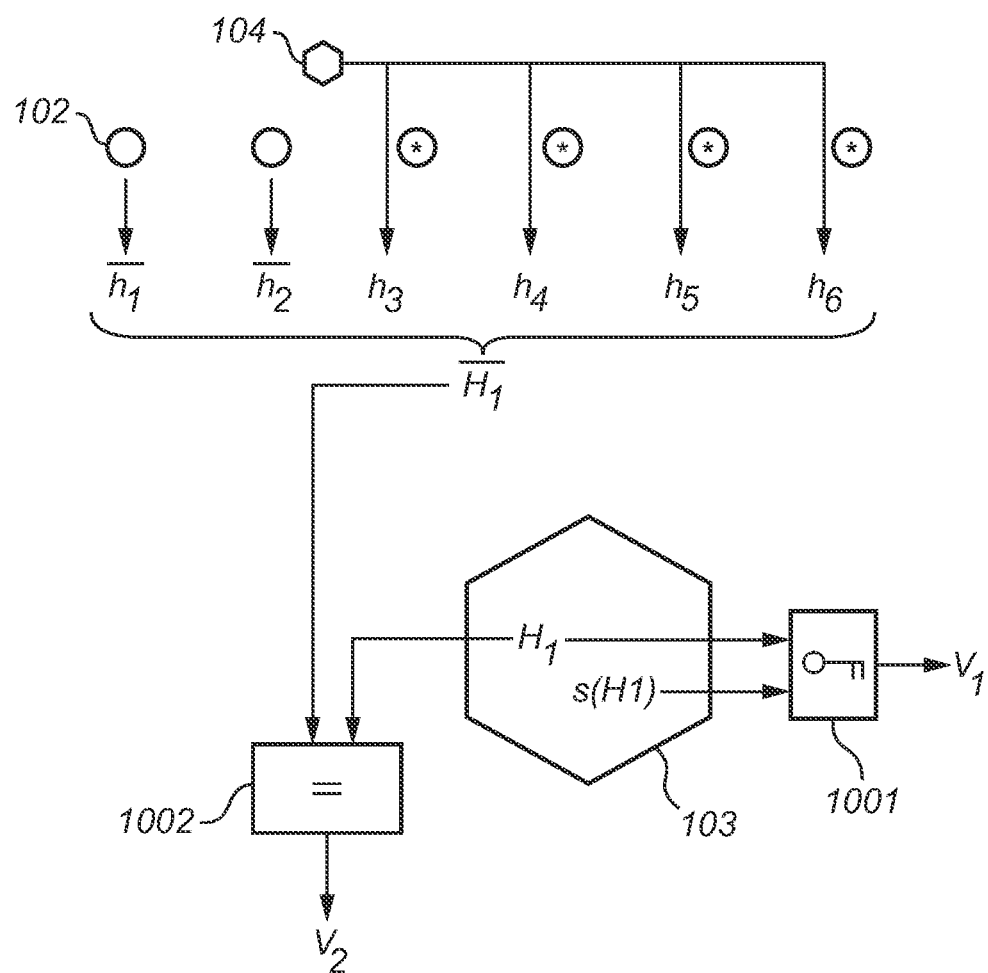
FIGS. 10A ('document approach') and 10B show a signed video bitstream and some of the operations within the method illustrated in FIG. 7.

In an optional first step 710 of the method 600, which is only carried out in some embodiments ('document approach'), the bitstring $H_1$ in one signature unit 103 is validated using the digital signature $s(H_1)$, so as to verify that the fingerprints contained therein are authentic, in a per se known manner. As illustrated in FIG. 10A, the validation may be performed using a cryptographic element 1001, which is located in the recipient device 800 and in which a public key is deposited. This can be described as an asymmetric signature setup, where signing and verification are distinct cryptographic operations corresponding to private/public keys. Other combinations of symmetric and/or asymmetric verification operations are possible without departing from the scope of the present disclosure. If the outcome V1 of the bitstring validation is negative (reject), the execution of the method 700 ends. If instead the outcome V1 is positive (approve), the execution of the method 700 proceeds to the second step 712.

In a second step 712, a fingerprint $h_1, h_2, \ldots$ of each data unit 102 associated with the signature unit 103 is obtained. An independent decision 712.1 on how to obtain the fingerprint can be made for each data unit. More precisely, either the fingerprint is computed 712.2 from the data unit, or the fingerprint is retrieved 712.3 from an archive object 104 in the bitstream. As explained above, the fingerprint can be computed from (a subset of) this data unit 102 directly, e.g., from transform coefficients or other video data therein, for from a reconstructed macroblock obtained by decoding the data unit 102. It is seen in FIG. 10, that the fingerprints $\overline{h_1}$, $\overline{h_2}$ are computed from the data units 102, whereas the remaining fingerprints $h_3, h_4, h_5, h_6$ are retrieved from the archive object 104. Accordingly, it is only fingerprints $\overline{h_1}, \overline{h_2}$ that can cause the validation in the forthcoming fourth step 716 to fail, in which case the failure suggests that an unauthorized manipulation of the bitstream B has taken place.

In a third step 714, a bitstring $\overline{H_1}$ is derived from the fingerprints thus obtained. This may be done according to a pre-agreed rule, e.g., by a procedure analogous to those described within step 610.2. It is recalled that the bitstring may be a combination of the obtained fingerprints or it may be a fingerprint of said combination of fingerprints.

Finally, in a fourth step 716, the data units associated with the signature unit 103 under consideration are validated using the digital signature in the signature unit 103. For the avoidance of doubt, it is noted that the validation in step 716 of the data units is indirect, without any processing that acts on the data units themselves.

Figure 10B:
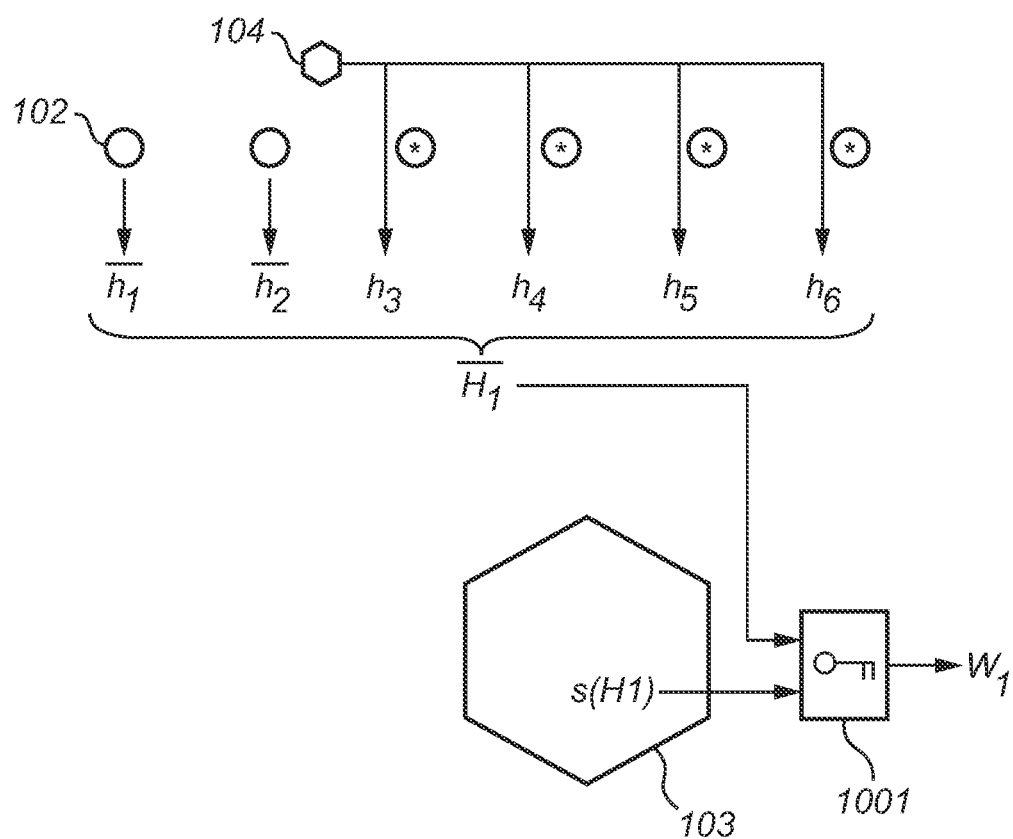

In embodiments where the signature units 103 do not contain the bitstring $H_1$, step 716 is executed by verifying the derived bitstring $\overline{H_1}$ using the digital signature $s(H_1)$. For example, the derived bitstring $\overline{H_1}$ can be verified using a public key belonging to the same key pair as the private key which was used to generate the digital signature $s(H_1)$. In FIG. 10B, this is illustrated by feeding the derived bitstring $\overline{H_1}$ and digital signature $s(H_1)$ to a cryptographic entity 1001 where the public key is stored, which outputs a binary result W1 representing the outcome of the verification.

Alternatively, in embodiments where the signature units 103 do contain the bitstring $H_1$ ('document approach'), said bitstring $H_1$ has been verified initially in step 710, and the verified bitstring $H_1$ is then compared, in step 716, with the derived bitstring $\overline{H_1}$. The comparison may be a bitwise equality check, as suggested by the functional block 1002 in FIG. 10A, which yields a true- or false-valued output V2. If the result V2 of the comparison is true, then it may be concluded that the signed video bitstream 100 is authentic as far as this signature unit 103 is concerned.

The execution of the method 700 may then include repeating relevant ones of the above-described steps 710, 712, 714 for any further signature units 103 in the signed video bitstream 100. If the outcome is positive for all signature units 103, it is concluded that the signed video bitstream 100 is valid, and it may be consumed or processed further. In the opposite case, the signed video bitstream 100 shall be considered unauthentic, and it may be quarantined from any further use or processing.

It is noted that the validation of the data units in the first set is based on a different trust relationship than the validation of the data units in the second set. The data units in the first set are validated by trusting the entity that created the digital signature $s(H_1)$, that is, the holder of the private key if asymmetric key cryptography is used. The data units in the second set are validated by trusting the entity which edited the signed bitstream B and created the archive objects.

In some embodiments of the validation method 700, the decision in substep 712.1 is guided by positions indicated in the archive object 104. These positions are positions of the macroblocks 101 which are represented by the data units 102 to which the archived fingerprints relate. Having access to these macroblock positions allows the recipient to perform a reliable completeness check, based on an assumption along the following lines: any macroblock 101 in a video frame 100 which cannot be reconstructed from the data units 102 in the signed video bitstream B is encoded by another data unit whose fingerprint can necessarily be retrieved from an archive object 104. If the archive object 104 does not indicate the positions of these macroblocks, the recipient may for example insert the missing fingerprints—those that are not computable from the data units 102 in the signed video bitstream B—by a trial and error approach. The trial and error approach may include executing steps 714 and 716 for each of the possible ways of inserting the archived fingerprints from the archive object 104 (each such way of inserting can be imagined to be a permutation of the positions of the missing macroblocks), and to conclude that the signed video bitstream B is unauthentic only if all of these executions fail.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. It is noted in particular that the above description of various embodiments has been focused on prediction-encoded video. However, the same approach can be used for any video, not only prediction-encoded video, as long as the entity signing the video and the entity verifying the video have access to reconstructed or decoded frames of the video. It may be seen that in the case of prediction-based encoding, it is practically convenient to employ fingerprints of groups of pixels that are also used as macroblocks in encoding. In general, however, fingerprints may be computed from groups of pixels grouped in other ways. Once a frame has been decoded, it does not matter what partitioning of the pixels was made for encoding. It may, for instance be useful to divide the decoded image into smaller or larger groups of pixels than were used for encoding, depending on what types of editing is expected. For example, if masking will always be done in the form of rectangles, a coarser partitioning of the pixels may suffice for the signing process than would be used for encoding. If, on the other hand, it is envisaged that masking could be done more closely following the contours of objects to mask, a finer partitioning may be useful for the signature process.

The invention claimed is:

1. A method of editing a signed video bitstream obtained by prediction coding of a video sequence, the signed video bitstream including data units and associated signature units, wherein each data unit represents at most one macroblock in a video frame of the prediction-coded video sequence, and wherein each signature unit includes a digital signature of a bitstring derived from a plurality of fingerprints of exactly one associated data unit each, the method comprising:
- receiving a request to substitute a region of at least one video frame;
- determining a first set of macroblocks, in which said region is contained, and a second set of macroblocks referring directly or indirectly to macroblocks in the first set;
- adding an archive object to the signed video bitstream, the archive object including fingerprints of a first and a second set of data units, which respectively represent the determined first and second set of macroblocks wherein the archive object includes positions of the first and second sets of macroblocks;
- editing the first set of data units in accordance with the request to substitute the region of the at least one video frame, wherein the editing of the first set of data units comprises:
- decoding the data unit into a reconstructed macroblock,
- providing an edited macroblock by performing the requested substitution on the reconstructed macroblock, and
- providing an edited data unit by encoding the edited macroblock; and
- re-encoding the second set of data units.

2. The method of claim 1, wherein the macroblock after the substitution is encoded as an independently decodable data unit.

3. The method of claim 1, further comprising using the reconstructed macroblock to decode a data unit in the second set, to facilitate said re-encoding.

4. The method of claim 1, wherein the second set of data units are re-encoded using reduced data compression.

5. The method of claim 1, wherein the second set of data units is re-encoded as independently decodable data units.

6. The method of claim 1, further comprising:
providing, in the signed video bitstream, one or more signature units associated with the edited first set of data units and the re-encoded second set of data units.

7. The method of claim 1, further comprising initially providing a signature unit by:
- computing a plurality of fingerprints of respective data units associated with the signature unit;
- deriving a bitstring from the plurality of fingerprints; and
- obtaining a digital signature of the bitstring wherein the bitstring is a combination of said plurality of fingerprints or a fingerprint of said combination.

8. The method of claim 7, wherein each fingerprint is computed
a) from the data unit, or
b) from a macroblock reconstructed from the data unit, or
c) from intermediate reconstruction data derived from the data unit.

9. The method of claim 1, wherein the received request is to substitute a region in a plurality of video frames.

10. A non-transitory computer readable recording medium comprising a computer program comprising instructions which, when the program is executed by a computer, cause the computer to carry out a method of editing a signed video bitstream obtained by prediction coding of a video sequence, the signed video bitstream including data units and associated signature units, wherein each data unit represents at most one macroblock in a video frame of the prediction-coded video sequence, and wherein each signature unit includes a digital signature of a bitstring derived from a plurality of fingerprints of exactly one associated data unit each, the method comprising:
- receiving a request to substitute a region of at least one video frame;
- determining a first set of macroblocks, in which said region is contained, and a second set of macroblocks referring directly or indirectly to macroblocks in the first set;
- adding an archive object to the signed video bitstream, the archive object including fingerprints of a first and a second set of data units, which respectively represent the determined first and second set of macroblocks wherein the archive object includes positions of the first and second sets of macroblocks;
- editing the first set of data units in accordance with the request to substitute the region of the at least one video frame, wherein the editing of the first set of data units comprises:
- decoding the data unit into a reconstructed macroblock,
- providing an edited macroblock by performing the requested substitution on the reconstructed macroblock, and
- providing an edited data unit by encoding the edited macroblock; and
- re-encoding the second set of data units.

11. A device comprising processing circuitry arranged to perform the method of editing a signed video bitstream obtained by prediction coding of a video sequence,
the signed video bitstream including data units and associated signature units, wherein each data unit represents at most one macroblock in a video frame of the prediction-coded video sequence, and wherein each signature unit includes a digital signature of a bitstring derived from a plurality of fingerprints of exactly one associated data unit each, the method comprising:
- receiving a request to substitute a region of at least one video frame;
- determining a first set of macroblocks, in which said region is contained, and a second set of macroblocks referring directly or indirectly to macroblocks in the first set;
- adding an archive object to the signed video bitstream, the archive object including fingerprints of a first and a second set of data units, which respectively represent the determined first and second set of macroblocks wherein the archive object includes positions of the first and second sets of macroblocks;
- editing the first set of data units in accordance with the request to substitute the region of the at least one video frame, wherein the editing of the first set of data units comprises:
- decoding the data unit into a reconstructed macroblock,
- providing an edited macroblock by performing the requested substitution on the reconstructed macroblock, and
- providing an edited data unit by encoding the edited macroblock; and
- re-encoding the second set of data units.

* * * * *